A. WENZEL.
PACKING RING.
APPLICATION FILED AUG. 14, 1912.
1,064,799.
Patented June 17, 1913.
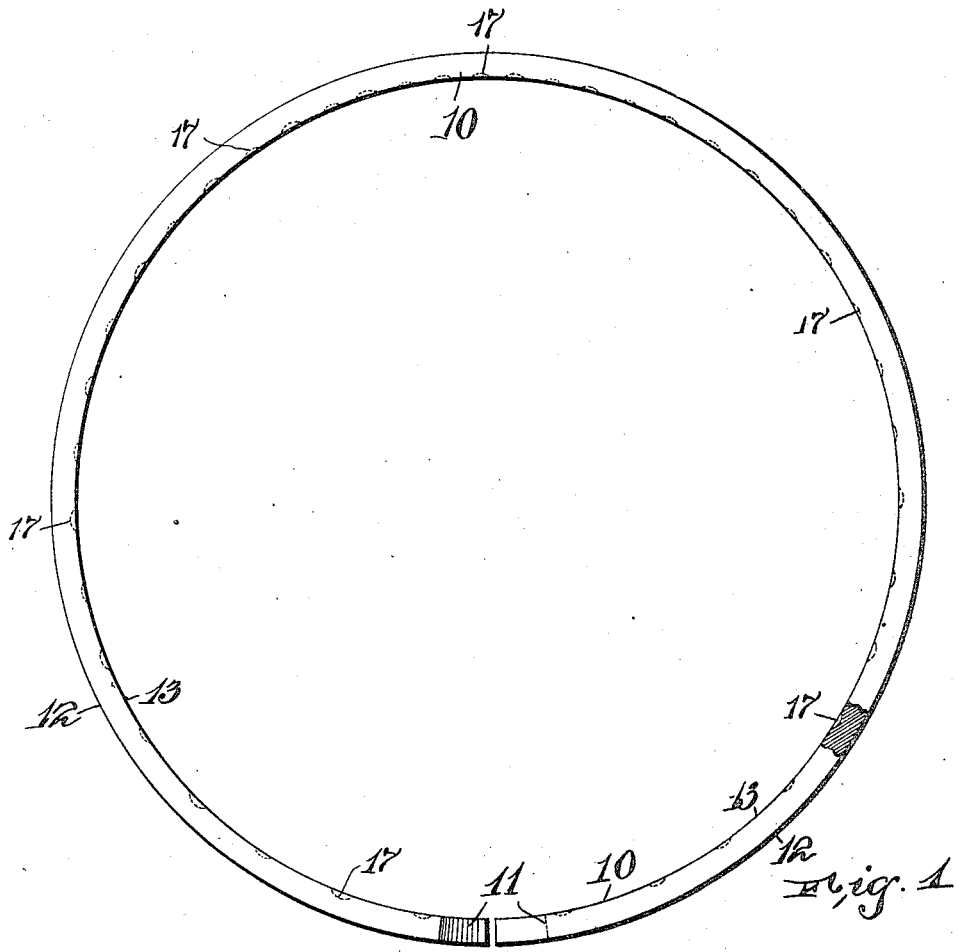
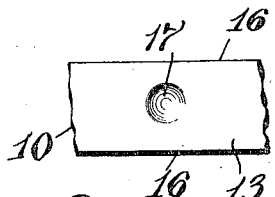
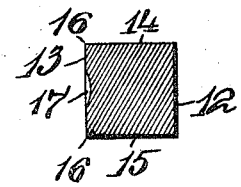
WITNESSES:
INVENTOR
Albert Wenzel,
BY
Wm. H. Canfield.
ATTORNEY

UNITED STATES PATENT OFFICE.

ALBERT WENZEL, OF NEWARK, NEW JERSEY.

PACKING-RING.

1,064,799.

Specification of Letters Patent. Patented June 17, 1913.

Application filed August 14, 1912. Serial No. 714,942.

*To all whom it may concern:*

Be it known that I, ALBERT WENZEL, a citizen of the United States, residing at Newark, in the county of Essex and State of New Jersey, have invented certain new and useful Improvements in Packing-Rings; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

The metal packing ring which is made according to this invention comprises a ring with its inner and outer faces concentric when the ring is in place in a cylinder or other receiving element, the ring being split to permit it to be sprung within the cylinder, since the ring is spread beyond its normal size by reason of its construction.

In an ordinary split ring without any variation in its cross-section, the spring is greatest adjacent to the split portion, that is, at its ends, and is least opposite the ends, and my invention gives such ring an even radial pressure all around its periphery when the ring is compressed.

The invention consists of a split metal ring adapted to be sprung together with its inner and outer faces concentric and having its corners continuous, one of the faces being constructed to give the ring a tension equal all around its periphery by indenting said face at varying distances.

The invention is illustrated in the accompanying drawing, in which—

Figure 1 is a side view of my improved piston ring. Fig. 2 is a face view, enlarged, of an indented part of the inner face of the ring, and Fig. 3 is a section through the indentation in Fig. 2.

The piston ring 10 is made in the form of a solid ring and then split as at 11 to allow for the expansion occurring in use, which is known to those skilled in the art. The ring is rectangular in cross-section, being usually made square, the thickness of the ring being the same all around. The outer face 12 of the ring engages the inner face of the cylinder or the like, the inner face 13 being within the groove in the piston, and the two side faces 14 and 15 engage the sides of said piston groove.

To form a good joint it is necessary that the inner corners 16 are unbroken and that the sides 14 and 15 are smooth and without indentations at their edges. Bearing in mind these necessities I have subjected the inner face to indenting operations, the indentations 17 being so disposed that they are varying distances apart, being placed close together at the point opposite the ends of the ring and gradually farther apart toward the ends. The space between the indentations at the point where they are closest together is slight, but it is gradually enlarged so that toward the ends, the space between the indentations exceeds the size of the indentations. The indentations are the same size all around the ring and the ring is not subjected at any one point to any heavier blow or indenting force than at another. This overcomes, to a great extent, the breaking of rings in their manufacture, as heavier blows at one place than at another breaks a great many rings. The indentations are placed entirely within the edges 16 so that these edges are not notched, and the indentations are preferably arranged along the approximate center of the inner face 13 and affect only about one-third the width of the ring, as will be seen from Fig. 2. These indentations so placed allow unbroken inner corners 16, and the piston ring has a uniform transverse measurement on all its sides throughout its entire length. The faces and sides of the ring are tight against any abutting surface and the corners in particular are continuous.

A ring constructed as above described has a uniform radial pressure at all points and insures a good contact of ring, cylinder and piston at all points.

Having thus described my invention, what I claim is:—

1. A split piston ring having indentations on its inner face, the indentations being closest together opposite the split portion and disposed farther apart as they approach the ends, the indentations terminating short of the sides of the ring.

2. A split piston ring having indentations arranged on its inner face within its side edges, the indentations being closest together opposite the split portion and being gradually spaced farther apart toward the ends, the indentations being of uniform depth.

3. A split piston ring having indentations on its inner face, the indentations being of uniform depth and being unevenly disposed to regulate the spring pressure of different portions of the ring.

4. A split piston ring having an inner and outer face and opposite sides, and indentations of uniform depth close together opposite the split portion and gradually spaced farther apart toward the ends of the ring, the indentations not extending to the sides of the ring whereby the transverse measurement on all sides is uniform throughout the entire ring.

In testimony, that I claim the foregoing, I have hereunto set my hand this 8th day of August, 1912.

ALBERT WENZEL.

Witnesses:
 WM. H. CAMFIELD,
 M. A. JOHNSON.

Copies of this patent may be obtained for five cents each, by addressing the "Commissioner of Patents, Washington, D. C."